Aug. 5, 1930.  M. C. HUTTO  1,772,045
CYLINDER GRINDER
Filed Aug. 9, 1926
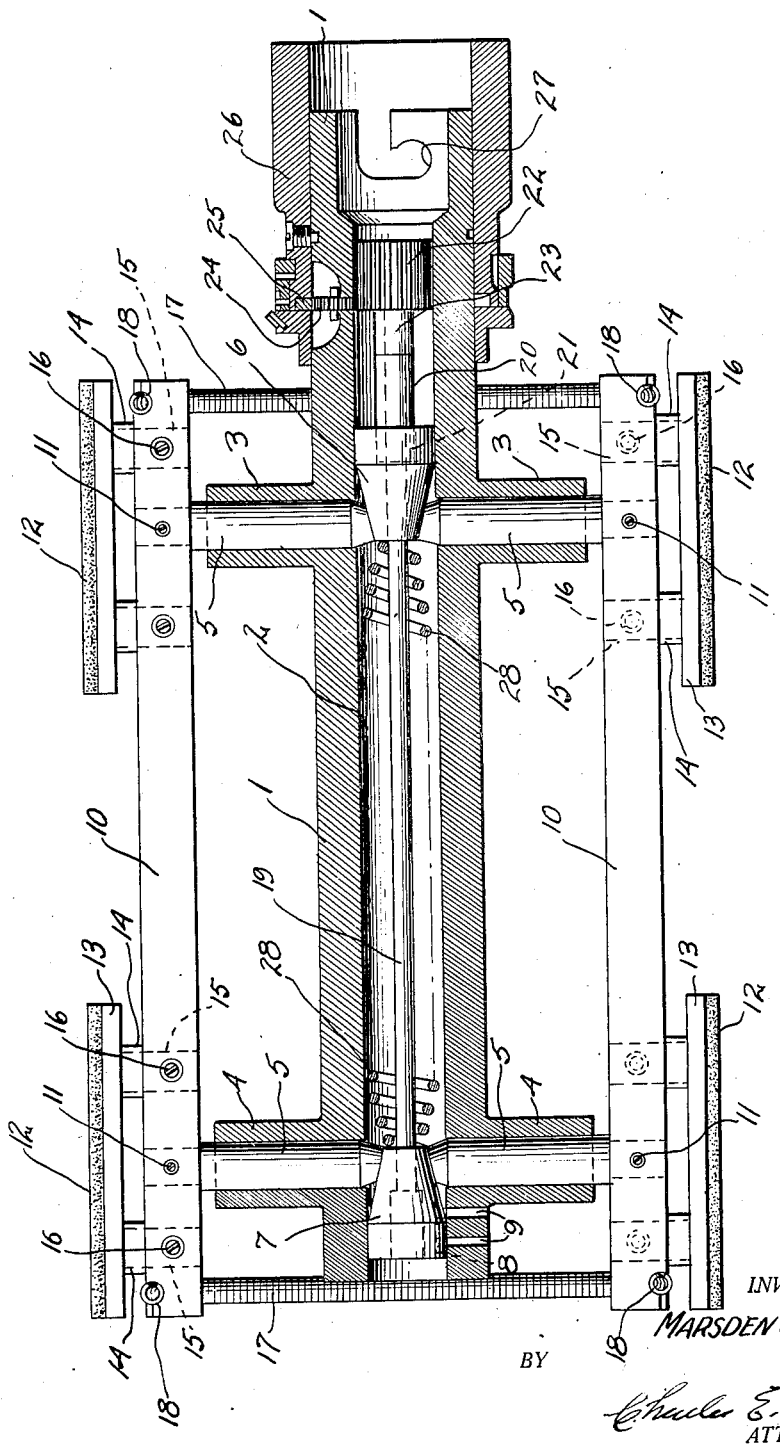
INVENTOR.
MARSDEN C. HUTTO
BY
Charles E. Niven
ATTORNEY.

Patented Aug. 5, 1930

1,772,045

UNITED STATES PATENT OFFICE

MARSDEN C. HUTTO, OF DETROIT, MICHIGAN

CYLINDER GRINDER

Application filed August 9, 1926. Serial No. 128,023.

This invention relates to cylinder grinders, and the object of the invention is to provide a cylinder grinder for grinding cylinders of large diameter and long bore.

One of the principal objects of the invention is to provide a method of mounting the grinding stones so that the stroke of the grinder may be much less than the length of the bore being ground.

Another object of the invention is to provide a means for expanding the several stones radially and uniformly alike.

A further object of the invention is to provide a grinder body having a series of stone supporting bars arranged radially thereabout, each bar carrying a grinding stone at each end and the several bars being radially adjustable uniformly.

These objects and the several novel features of the invention are hereinafter more fully described and claimed and the preferred form of construction by which these objects are attained is shown in the accompanying drawings in which—

The figure is a longitudinal section through a cylinder embodying my invention.

The device comprises a body 1 having a cylindrical bore 2 therethrough. The body 1 is provided with a series of radially extending arms 3 at one end thereof and a similar series of arms 4 at the opposite end thereof. The arms are each provided with a radial aperture opening into the central bore 2 which provide guides for the adjusting pins 5 mounted therein. The pins in the arms 3 seat on the cone 6 while the pins in the arms 4 seat on the cone 7. The cone 7 is provided with a keyway 8 and a pair of dowel pins 9 are mounted in the body 1 and extend into the keyway 8 to prevent the cone 7 from rotating in the body 1. The pins are secured in a series of bars 10 each pin being secured in the respective bar by means of a tapered pin 11. A grinding stone 12 is provided at each end of the bar 10 and each grinding stone is held in a steel holder 13 having a pair of bosses 14 from which the pins 15 extend into apertures in the bar 10 and a set screw 16 is provided for each pin 15 for securing the pins in the bar. By this arrangement the faces of the grinding stones may be adjusted to accurate parallel alignment with the bars 10 in which they are mounted.

In order to hold the pins 5 against the cones 6 and 7 a coiled spring 17 is provided at each end of the bars 10 and engages in the notches 18 provided in the ends of the bars. These springs 17 tend to contract the bars and thus seat the pins 5 on the respective cones.

A shaft 19 extends longitudinally of the bore 2 and is threaded into the cone 7 at one end. The opposite end of the shaft 19 extends through the cone 6 and a tubular spacing member 20 is positioned over the end of the shaft 19 and seats in a recess 21 provided in the cone 6. A gear 22 is secured to the extreme end of the shaft 19 by means of the pin 23. The gear 22 meshes with a gear 24 which is rotatably mounted in the body 1 and the gear 24 meshes with the ring gear 25 secured in the sleeve 26. By this arrangement rotation of the sleeve 26 rotates the idler gear 24 which in turn rotates the gear 22 and threads the shaft 19 into the cone 7 thus drawing the cones 6 and 7 together and forcing the pins 5 outwardly which moves the bars 10 and grinding stones 12 outwardly to increase the grinding diameter. The mechanism for varying the grinding diameter is the same as that shown in my pending application No. 77,430, filed December 24, 1925 and entitled Automatic cylinder grinder.

This grinder is inserted in the cylinder to be ground and the entire device is rotated by means of the driving member 1 and the device is moved longitudinally in the cylinder while it is rotating so that the grinding stones grind the entire inner surface of the cylinder. By arranging the stones in series at each end of the grinder, the grinder need be moved longitudinally in the cylinder only a distance equal to the space between the series of stones to cover the entire inner surface of the cylinder so that a long cylinder may be ground with about half the length of stroke that would be required with only one series of grinding stones. The two series of grinding stones also support the grinder at each end in the cylinder and thus hold the grinder in perfect alignment in the cylinder bore. By arranging the stones and holders on the bars as shown the stones may be very easily replaced at any time and thus the grinder may be easily equipped with coarse or fine grinding stones as required. To decrease the grinding diameter it is only necessary to rotate the sleeve 26 in the opposite direction which, through means of the ring gear 25 and idler gear 24, reverses the rotation of the gear 22 thus unthreading the shaft 19 from the cone 7 and allowing the coiled spring 28 to move the cones 6 and 7 apart. As the cones 6 and 7 move apart the tension of the springs 17 forces the bars 10 and pins 5 inwardly thus decreasing the grinding diameter of the stones.

From the foregoing description it becomes evident that the device is very simple and efficient in operation, provides an adjusting mechanism which may float in the body, allows ready replacement of the stones at any time and provides a device which holds the grinder in alignment in the cylinder bore and allows the cylinder to be ground with much less longitudinal movement of the grinder than is ordinarily required.

Having thus fully described my invention, its utility and mode of operation, what I claim and desire to secure by Letters Patent of the United States is—

1. In a cylinder grinder, the combination of a body member, a pair of opposing cones mounted on said body member, means for adjusting the cones relatively to each other lengthwise of said body member, a plurality of longitudinal supporting bars arranged in an annular row around the periphery of said body member, sliding pins extending inwardly from each of said bars and guided for radial movement on said body member and engaged at their inner ends with said cones, each of said bars being provided with a pair of apertures which are arranged lengthwise in line, a stone holder provided with a pair of retaining pins extending into each pair of apertures, on said bars, set screws mounted on said bars and each engaging with one of said retaining pins, and a grinding stone mounted on said stone holder.

2. In a cylinder grinder, the combination of a body member, a pair of opposing cones mounted on said body member, means for adjusting the cones relatively to each other lengthwise of said body member, a plurality of longitudinal bars arranged in an annular row around the periphery of said body member, sliding pins extending inwardly from each of said bars and guided for radial movement on said body member and engaging at their inner ends with said cones, each of said bars being provided with a pair of apertures which are arranged on opposite sides of one of the sliding pins of said bar and which are arranged in line lengthwise of said bar, a stone holder adjacent to the outer side of each bar and provided with a pair of retaining pins extending into the pair of apertures on opposite sides of each sliding pin, a grinding stone mounted on said holder, and means for securing said retaining pins in said apertures.

3. In a cylinder grinder, the combination of a body member, a plurality of longitudinal supporting bars arranged in an annular row around the periphery of said body member, means for adjusting said supporting bars radially relatively to said body member, stone holders separate from the supporting bars and mounted on the outer side of each of said supporting bars at opposite ends thereof and arranged lengthwise in line with each other, and a grinding stone mounted on each of said stone holders.

In testimony whereof I sign this specification.

MARSDEN C. HUTTO.